US012769782B2

(12) United States Patent
Zhu et al.

(10) Patent No.: US 12,769,782 B2
(45) Date of Patent: Oct. 20, 2026

(54) USING ARTIFICIAL INTELLIGENCE AGENTS FOR SERVICING SEARCH QUERIES

(71) Applicant: Maplebear Inc., San Francisco, CA (US)

(72) Inventors: Yuanzheng Zhu, Smyrna, GA (US); Akshay Nair, San Francisco, CA (US); Taesik Na, Issaquah, WA (US); Tejaswi Tenneti, San Carlos, CA (US); Shrikar Archak, Danville, CA (US); Raochuan Fan, Sunnyvale, CA (US)

(73) Assignee: Maplebear Inc., San Francisco, CA (US)

( * ) Notice: Subject to any disclaimer, the term of this patent is extended or adjusted under 35 U.S.C. 154(b) by 0 days.

(21) Appl. No.: 19/090,346

(22) Filed: Mar. 25, 2025

(65) Prior Publication Data

US 2026/0300372 A1 Oct. 1, 2026

(51) Int. Cl.
*G06F 16/383* (2019.01)
*G06F 16/3329* (2025.01)

(52) U.S. Cl.
CPC ........ *G06F 16/383* (2019.01); *G06F 16/3329* (2019.01)

(58) Field of Classification Search
None
See application file for complete search history.

(56) References Cited

U.S. PATENT DOCUMENTS

| | | | | |
|---|---|---|---|---|
| 12,014,140 | B2 * | 6/2024 | Vijayaraghavan .... | G06F 40/247 |
| 2022/0148062 | A1 * | 5/2022 | Sinha ...................... | G06N 20/00 |
| 2024/0004886 | A1 * | 1/2024 | Cooley ............. | G06F 16/24578 |
| 2024/0193664 | A1 * | 6/2024 | Ma ..................... | G06Q 30/0631 |
| 2024/0257209 | A1 * | 8/2024 | Wang ................. | G06Q 30/0631 |
| 2024/0257214 | A1 * | 8/2024 | Vashishtha ......... | G06Q 30/0631 |

* cited by examiner

*Primary Examiner* — Richard L Bowen
(74) *Attorney, Agent, or Firm* — Fenwich & West LLP

(57) ABSTRACT

Disclosed herein is a system for selecting complementary items to display in response to a search query. The system receives a query entered at a search interface presented at a client device. The system determines items associated with the query and selects complementary items based on the query. The system applies a first generative language model tuned to score complementary items based on presentation requirements. The system applies a second generative language model tuned to score complementary items based on historical presentation instances. The system aggregates scores output by the first and second generative models and ranks the complementary items based on the aggregate scores. The system sends ranked complementary items for display at the search interface.

20 Claims, 6 Drawing Sheets

USING ARTIFICIAL INTELLIGENCE AGENTS FOR SERVICING SEARCH QUERIES

BACKGROUND

Search engines are widely used in online systems to provide information to users. Conventionally, when an online system receives a search query, the system retrieves and presents content that most closely matches the search query. However, users may also be interested in complementary content that is not directly relevant to the search query but is still related in some way to the search query. For example, if a user searches for hamburger patties, various hamburger patty items may be directly relevant to the search query, but items related to hamburger buns and other condiments may also be of interest. Further, content may be associated with presentation requirements, which conventional systems ignore or present without accounting for how close the content is to the search query. Thus, a system for optimizing content selection to account for presentation requirements, query-content similarity, and other presentation metrics is necessary.

SUMMARY

One or more embodiments include a system that determines categories of content to display in response to a search query by balancing presentation requirements and presentation history of the content. In particular, the system selects one or more items to present to a user in response to a search query. The system uses a set of generative language models to select complementary items for the one or more items that have not met their presentation requirements and complementary items that have historically received a threshold number of interactions, thus indicating that the complementary items are well-received and/or desirable to users of the system.

In some embodiments, the system receives a search query entered at a user interface. The system retrieves one or more items that are responsive to the search query. The system selects a set of complementary items to the one or more items, where the complementary items have a threshold level of similarity to at least one of the one or more items. The system applies a first generative language model to the set of complementary items. The first generative language model is tuned on presentation requirements for each of the set of complementary items. The presentation requirements associated with each complementary item include a prospective number of presentation instances for the respective complementary item at one or more client devices. The system receives a first set of scores for the complementary items from the first generative language model.

The system applies a second generative language model to the set of complementary items. The second generative language model is tuned with historical presentation instances of each of the set of complementary items. The system receives a second set of scores for the complementary items from the second generative language model. The system aggregates, for each of the set of complementary items, respective scores from the first set of scores and the second set of scores and ranks the set of complementary items based on the aggregate scores. The system sends the ranked set of complementary items for display at the user interface.

DETAILED DESCRIPTION

Figure 1A:
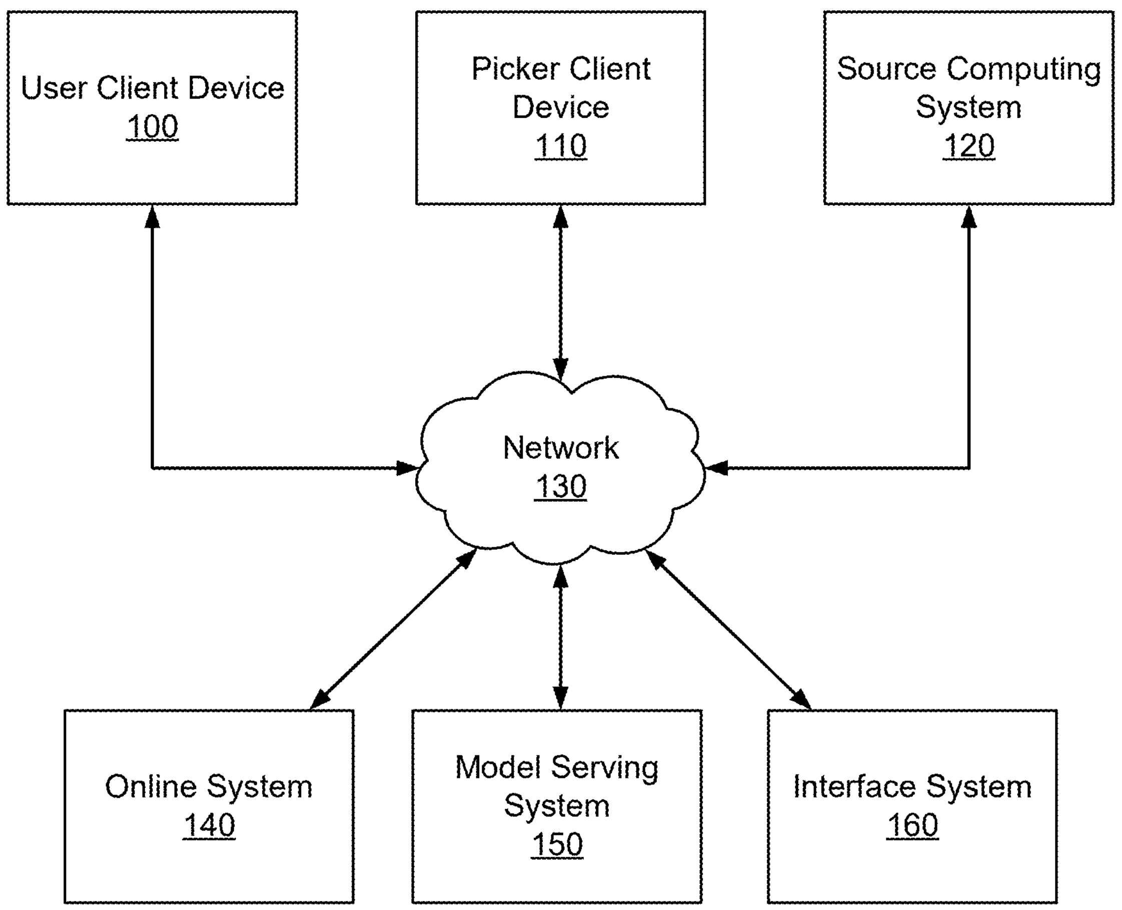
FIG. 1A illustrates an example system environment for an online system, in accordance with one or more embodiments.

FIG. 1A illustrates an example system environment for an online system 140, in accordance with one or more embodiments. The system environment illustrated in FIG. 1A includes a user client device 100, a picker client device 110, a source computing system 120, a network 130, an online system 140, a model serving system 150 and/or an interface system 160. Alternative arrangements may include more, fewer, or different components from those illustrated in FIG. 1A, and the functionality of each component may be divided between the components differently from the description below. Additionally, each component may perform their respective functionalities in response to a request from a human, or automatically without human intervention.

Although one user client device 100, picker client device 110, and source computing system 120 are illustrated in FIG. 1A, any number of users, pickers, and sources may interact with the online system 140. As such, there may be more than one user client device 100, picker client device 110, or source computing system 120.

The user client device 100 is a client device through which a user may interact with the picker client device 110, the source computing system 120, or the online system 140. The user client device 100 can be a personal or mobile computing device, such as a smartphone, a tablet, a laptop computer, or desktop computer. In some embodiments, the user client device 100 executes a client application that uses an application programming interface (API) to communicate with the online system 140.

A user uses the user client device 100 to place an order with the online system 140. An order specifies a set of items to be delivered to the user. An "item," as used herein, means a good or product that can be provided to the user through the online system 140. The order may include item identifiers (e.g., a stock keeping unit (SKU) or a price look-up (PLU) code) for items to be delivered to the user and may include quantities of the items to be delivered. Additionally, an order may further include a delivery location to which the ordered items are to be delivered and a timeframe during which the items should be delivered. In some embodiments, the order also specifies one or more sources from which the ordered items should be collected.

The user client device 100 presents an ordering interface to the user. The ordering interface is a user interface that the user can use to place an order with the online system 140.

The ordering interface may be part of a client application operating on the user client device 100. The ordering interface allows the user to search for items that are available through the online system 140 and the user can select which items to add to an "ordering list." A "ordering list," as used herein, is a tentative set of items that the user has selected for an order but that has not yet been finalized for an order. The ordering list may alternatively be referred to as a "cart" or "shopping cart." The ordering interface allows a user to update the ordering list, e.g., by changing the quantity of items, adding or removing items, or adding instructions for items that specify how the item should be collected.

The user client device 100 may receive additional content from the online system 140 to present to a user. For example, the user client device 100 may receive coupons, recipes, or item suggestions. The user client device 100 may present the received additional content to the user as the user uses the user client device 100 to place an order (e.g., as part of the ordering interface).

Additionally, the user client device 100 includes a communication interface that allows the user to communicate with a picker that is servicing the user's order. This communication interface allows the user to input a text-based message to transmit to the picker client device 110 via the network 130. The picker client device 110 receives the message from the user client device 100 and presents the message to the picker. The picker client device 110 also includes a communication interface that allows the picker to communicate with the user. The picker client device 110 transmits a message provided by the picker to the user client device 100 via the network 130. In some embodiments, messages sent between the user client device 100 and the picker client device 110 are transmitted through the online system 140. In addition to text messages, the communication interfaces of the user client device 100 and the picker client device 110 may allow the user and the picker to communicate through audio or video communications, such as a phone call, a voice-over-IP call, or a video call.

The picker client device 110 is a client device through which a picker may interact with the user client device 100, the source computing system 120, or the online system 140. The picker client device 110 can be a personal or mobile computing device, such as a smartphone, a tablet, a laptop computer, or a desktop computer. In some embodiments, the picker client device 110 executes a client application that uses an application programming interface (API) to communicate with the online system 140.

The picker client device 110 receives orders from the online system 140 for the picker to service. A picker services an order by collecting the items listed in the order from a source. The picker client device 110 presents the items that are included in the user's order to the picker in a collection interface. The collection interface is a user interface that provides information to the picker on which items to collect for a user's order and the quantities of the items. In some embodiments, the collection interface provides multiple orders from multiple users for the picker to service at the same time from the same source location. The collection interface further presents instructions that the user may have included related to the collection of items in the order. Additionally, the collection interface may present a location of each item at the source and may even specify a sequence in which the picker should collect the items for improved efficiency in collecting items. In some embodiments, the picker client device 110 transmits to the online system 140 or the user client device 100 which items the picker has collected in real time as the picker collects the items.

The picker can use the picker client device 110 to keep track of the items that the picker has collected to ensure that the picker collects all the items for an order. The picker client device 110 may include a barcode scanner that can decode an item identifier encoded in a machine-readable label (e.g., a barcode or a QR code) coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and identifies the item identifier for the item based on the images. The picker client device 110 may determine the item identifier directly or by transmitting the images to the online system 140. Furthermore, the picker client device 110 determines weights for items that are priced by weight. The picker client device 110 may prompt the picker to manually input the weight of an item or may communicate with a weighing system in the source location to receive the weight of an item.

When the picker has collected the items for an order, the picker client device 110 instructs a picker on where to deliver the items for a user's order. For example, the picker client device 110 displays a delivery location from the order to the picker. The picker client device 110 also provides navigation instructions for the picker to travel from the source location to the delivery location. When a picker is servicing more than one order, the picker client device 110 identifies which items should be delivered to which delivery location. The picker client device 110 may provide navigation instructions from the source location to each of the delivery locations. The picker client device 110 may receive one or more delivery locations from the online system 140 and may provide the delivery locations to the picker so that the picker can deliver the corresponding one or more orders to those locations. The picker client device 110 may also provide navigation instructions for the picker from the source location from which the picker collected the items to the one or more delivery locations.

In some embodiments, the picker client device 110 tracks the location of the picker as the picker delivers orders to delivery locations. The picker client device 110 collects location data and transmits the location data to the online system 140. The online system 140 may transmit the location data to the user client device 100 for display to the user, so that the user can keep track of when their order will be delivered. Additionally, the online system 140 may generate updated navigation instructions for the picker based on the picker's location. For example, if the picker takes a wrong turn while traveling to a delivery location, the online system 140 determines the picker's updated location based on location data from the picker client device 110 and generates updated navigation instructions for the picker based on the updated location.

In some embodiments, the picker is a single person who collects items for an order from a source location and delivers the order to the delivery location for the order. Alternatively, more than one person may serve the role of a picker for an order. For example, multiple people may collect the items at the source location for a single order. Similarly, the person who delivers an order to its delivery location may be different from the person or people who collected the items from the source location. In these embodiments, each person may have a picker client device 110 that they can use to interact with the online system 140.

Additionally, while the description herein may primarily refer to pickers as humans, in some embodiments, some or all of the steps taken by the picker may be automated. For example, a semi- or fully-autonomous robot may collect items in a source location for an order and an autonomous vehicle may deliver an order to a user from a source location.

In one or more embodiments, the online system 140 communicates with a smart shopping cart being used by a user to collect items in a source location. For example, the smart shopping cart may display content received from the online system and may receive data describing items that are collected by the user and stored in a storage area of the shopping cart. In some embodiments, the smart shopping cart is a picker client device 110 being operated by a picker collecting items within a source location. Similarly, the smart shopping cart may be operated by a user within the source location collecting items for themselves. Example embodiments of smart shopping carts are described in U.S. patent application Ser. No. 18/630,672, entitled “Automated Identification of Items Placed in a Cart and Recommendations based on Same,” filed Apr. 9, 2024, which is hereby incorporated by reference in its entirety.

The source computing system 120 is a computing system operated by a source that interacts with the online system 140. As used herein, a “source” is an entity that operates a “source location,” which is a store, warehouse, or any other source from which a picker can collect items. The source computing system 120 stores and provides item data to the online system 140 and may regularly update the online system 140 with updated item data. For example, the source computing system 120 provides item data indicating which items are available at a particular source location and the quantities of those items. Additionally, the source computing system 120 may transmit updated item data to the online system 140 when an item is no longer available at the source location. Additionally, the source computing system 120 may provide the online system 140 with updated item prices, sales, or availabilities. Additionally, the source computing system 120 may receive payment information from the online system 140 for orders serviced by the online system 140. Alternatively, the source computing system 120 may provide payment to the online system 140 for some portion of the overall cost of a user’s order (e.g., as a commission).

The user client device 100, the picker client device 110, the source computing system 120, and the online system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of the standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online system 140 is an online system by which users can order items to be provided to them by a picker from a source. The online system 140 receives orders from a user client device 100 through the network 130. The online system 140 selects a picker to service the user’s order and transmits the order to a picker client device 110 associated with the picker. If the picker accepts the order, the picker collects the ordered items from a source location and delivers the ordered items to the user. The online system 140 may charge a user for the order and provide portions of the payment from the user to the picker and the source.

As an example, the online system 140 may allow a user to order groceries from a grocery store source. The user’s order may specify which groceries they want to be delivered from the grocery store and the quantities of each of the groceries. The user’s client device 100 transmits the user’s order to the online system 140 and the online system 140 selects a picker to travel to the grocery store source location to collect the groceries ordered by the user. The online system transmits an offer to the picker for the picker to service the order in exchange for consideration and, if the picker accepts the offer, the picker collects the groceries from the grocery store. Once the picker has collected the groceries ordered by the user, the picker delivers the groceries to a location transmitted to the picker client device 110 by the online system 140. The online system 140 is described in further detail below with regards to FIG. 2.

The model serving system 150 receives requests from the online system 140 to perform tasks using machine-learned models. The tasks include, but are not limited to, natural language processing (NLP) tasks, audio processing tasks, image processing tasks, video processing tasks, and the like. In one or more embodiments, the machine-learned models deployed by the model serving system 150 are models configured to perform one or more NLP tasks. The NLP tasks include, but are not limited to, text generation, query processing, machine translation, chatbots, and the like. In one or more embodiments, the language model is configured as a transformer neural network architecture. Specifically, the transformer model is coupled to receive sequential data tokenized into a sequence of input tokens and generates a sequence of output tokens depending on the task to be performed.

The model serving system 150 receives a request including input data (e.g., text data, audio data, image data, or video data) and encodes the input data into a set of input tokens. The model serving system 150 applies the machine-learned model to generate a set of output tokens. Each token in the set of input tokens or the set of output tokens may correspond to a text unit. For example, a token may correspond to a word, a punctuation symbol, a space, a phrase, a paragraph, and the like. For an example query processing task, the language model may receive a sequence of input tokens that represent a query and generate a sequence of output tokens that represent a response to the query. For a translation task, the transformer model may receive a sequence of input tokens that represent a paragraph in German and generate a sequence of output tokens that represents a translation of the paragraph or sentence in English. For a text generation task, the transformer model may receive a prompt and continue the conversation or expand on the given prompt in human-like text.

When the machine-learning model is a language model, the sequence of input tokens or output tokens are arranged as a tensor with one or more dimensions, for example, one dimension, two dimensions, or three dimensions. For example, one dimension of the tensor may represent the number of tokens (e.g., length of a sentence), one dimension of the tensor may represent a sample number in a batch of input data that is processed together, and one dimension of the tensor may represent a space in an embedding space. However, it is appreciated that in other embodiments, the input data or the output data may be configured as any number of appropriate dimensions depending on whether the data is in the form of image data, video data, audio data, and the like. For example, for three-dimensional image data, the input data may be a series of pixel values arranged along a first dimension and a second dimension, and further arranged along a third dimension corresponding to RGB channels of the pixels.

In one or more embodiments, the language models are large language models (LLMs) that are trained on a large corpus of training data to generate outputs for the NLP tasks. An LLM may be trained on massive amounts of text data, often involving billions of words or text units. The large amount of training data from various data sources allows the LLM to generate outputs for many tasks. An LLM may have a significant number of parameters in a deep neural network (e.g., transformer architecture), for example, at least 1 billion, at least 15 billion, at least 135 billion, at least 175 billion, at least 500 billion, at least 1 trillion, at least 1.5 trillion parameters.

Since an LLM has significant parameter size and the amount of computational power for inferencing or training the LLM is high, the LLM may be deployed on an infrastructure configured with, for example, supercomputers that provide enhanced computing capability (e.g., graphic processor units or GPU) for training or deploying. In one instance, the LLM may be trained and deployed or hosted on a cloud infrastructure service. The LLM may be pre-trained by the online system 140 or one or more entities different from the online system 140. An LLM may be trained on a large amount of data from various data sources. For example, the data sources include websites, articles, posts on the web, and the like. From this massive amount of data coupled with the computing power of GPUs, the LLM is able to perform various tasks and synthesize and formulate output responses based on information extracted from the training data.

In one or more embodiments, when the machine-learned model including the LLM is a transformer-based architecture, the transformer has a generative pre-training (GPT) architecture including a set of decoders that each perform one or more operations to input data to the respective decoder. A decoder may include an attention operation that generates keys, queries, and values from the input data to the decoder to generate an attention output. In one or more other embodiments, the transformer architecture may have an encoder-decoder architecture and includes a set of encoders coupled to a set of decoders. An encoder or decoder may include one or more attention operations.

While a LLM with a transformer-based architecture is described in one or more embodiments, it is appreciated that in other embodiments, the language model can be configured as any other appropriate architecture including, but not limited to, long short-term memory (LSTM) networks, Markov networks, BART, generative-adversarial networks (GAN), diffusion models (e.g., Diffusion-LM), and the like.

In one or more embodiments, the task for the model serving system 150 is based on knowledge of the online system 140 that is fed to the machine-learned model of the model serving system 150, rather than relying on general knowledge encoded in the model weights of the model. Thus, one objective may be to perform various types of queries on the external data in order to perform any task that the machine-learned model of the model serving system 150 could perform. For example, the task may be to perform question-answering, text summarization, text generation, and the like based on information contained in an external dataset.

Thus, in one or more embodiments, the online system 140 is connected to an interface system 160. The interface system 160 receives external data from the online system 140 and builds a structured index over the external data using, for example, another machine-learned language model or heuristics. The interface system 160 receives one or more queries from the online system 140 on the external data. The interface system 160 constructs one or more prompts for input to the model serving system 150. A prompt may include the query of the user and context obtained from the structured index of the external data. In one instance, the context in the prompt includes portions of the structured indices as contextual information for the query. The interface system 160 obtains one or more responses from the model serving system 160 and synthesizes a response to the query on the external data. While the online system 140 can generate a prompt using the external data as context, oftentimes, the amount of information in the external data exceeds prompt size limitations configured by the machine-learned language model. The interface system 160 can resolve prompt size limitations by generating a structured index of the data and offers data connectors to external data sources.

Figure 1B:
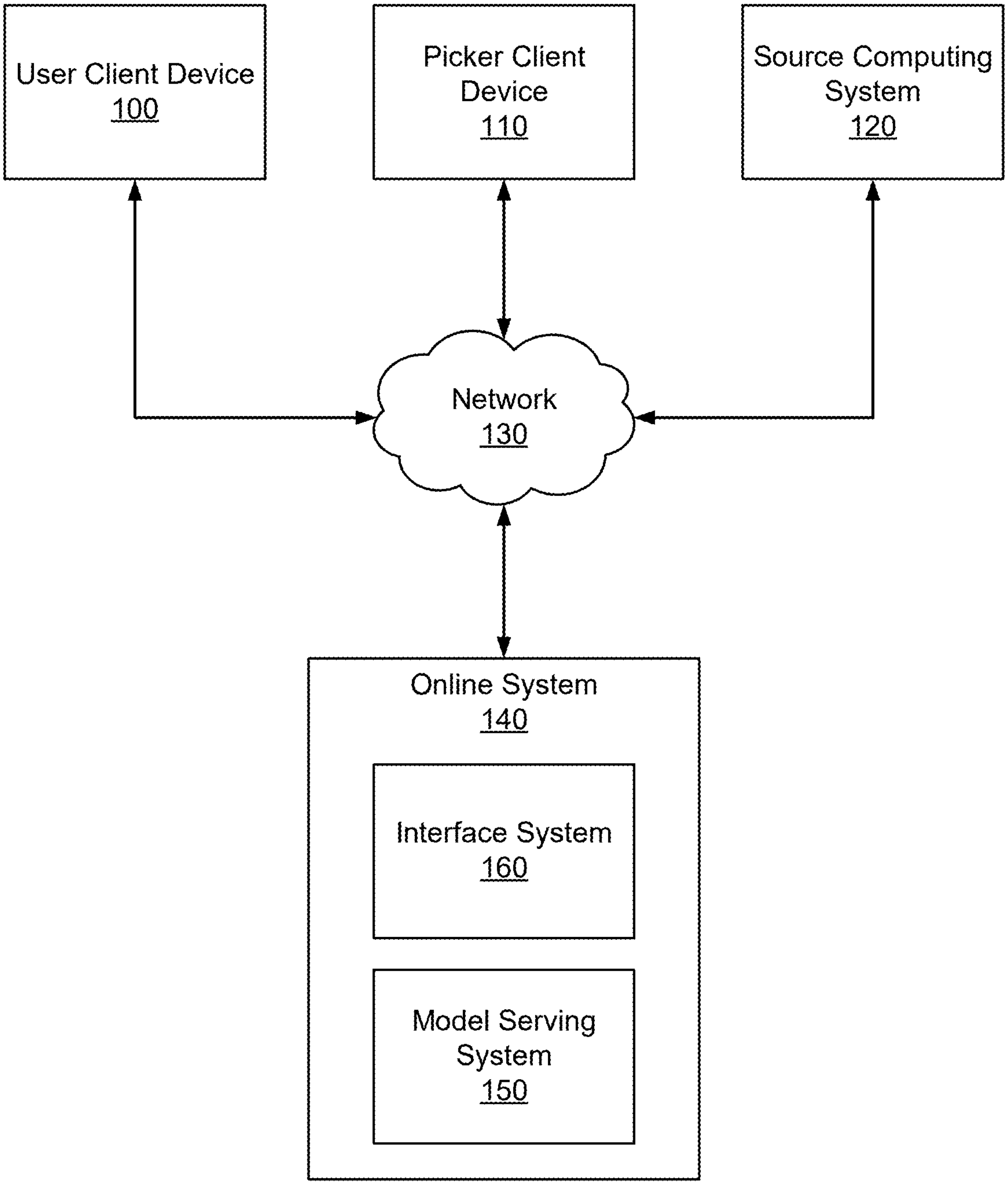
FIG. 1B illustrates an example system environment for an online system, in accordance with one or more embodiments.

FIG. 1B illustrates an example system environment for an online system 140, in accordance with one or more embodiments. The system environment illustrated in FIG. 1B includes a user client device 100, a picker client device 110, a source computing system 120, a network 130, and an online system 140. Alternative embodiments may include more, fewer, or different components from those illustrated in FIG. 1B, and the functionality of each component may be divided between the components differently from the description below. Additionally, each component may perform their respective functionalities in response to a request from a human, or automatically without human intervention.

The example system environment in FIG. 1A illustrates an environment where the model serving system 150 or the interface system 160 is managed by a separate entity from the online system 140. In one or more embodiments, as illustrated in the example system environment in FIG. 1B, the model serving system 150 and/or the interface system 160 is managed and deployed by the entity managing the online system 140.

Figure 2:
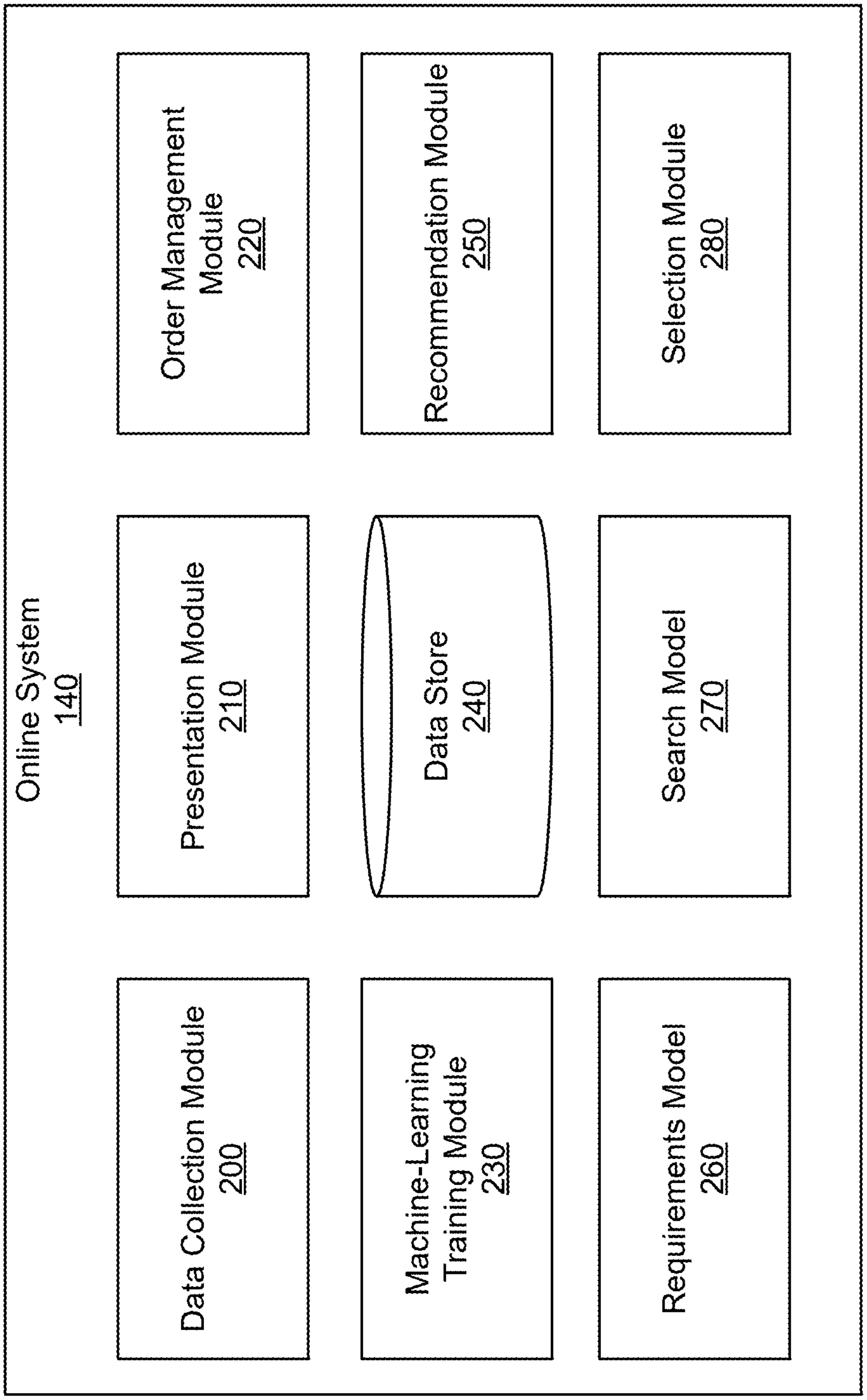
FIG. 2 illustrates an example system architecture for an online system, in accordance with one or more embodiments.

FIG. 2 illustrates an example system architecture for an online system 140, in accordance with some embodiments. The system architecture illustrated in FIG. 2 includes a data collection module 200, a presentation module 210, an order management module 220, a machine-learning training module 230, a data store 240, a recommendation module 250, a requirements model 260, a search model 270, and/or a selection model 280. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online system 140 and stores the data in the data store 240. In preferred embodiments, the data collection module 200 only collects data describing a user if the user has previously explicitly consented to the online system 140 collecting data describing the user. Additionally, the data collection module 200 may encrypt all data, including sensitive or personal data, describing users.

For example, the data collection module 200 collects user data, which is information or data that describe characteristics of a user. User data may include a user's name, address, shopping preferences, favorite items, or stored payment instruments. The user data also may include default settings established by the user, such as a default source/source location, payment instrument, delivery location, or delivery timeframe. The data collection module 200 may collect the user data from sensors on the user client device 100 or based on the user's interactions with the online system 140.

The data collection module 200 also collects item data, which is information or data that identifies and describes items that are available at a source location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in source locations. For example, for each item-source combination (a particular item at a particular warehouse), the item data may include a time that the item was last found, a time that the item was last not found (a picker looked for the item but could not find it), the rate at which the item is found, or the popularity of the item. The data collection module 200 may collect item data from a source computing system 120, a picker client device 110, or the user client device 100.

An item category is a set of items that are a similar type of item. Items in an item category may be considered to be equivalent to each other or may be replacements for each other in an order. For example, different brands of sourdough bread may be different items, but these items may be in a "sourdough bread" item category. The item categories may be human-generated and human-populated with items. The item categories also may be generated automatically by the online system 140 (e.g., using a clustering algorithm).

The data collection module 200 also collects picker data, which is information or data that describes characteristics of pickers. For example, the picker data for a picker may include the picker's name, the picker's location, how often the picker has serviced orders for the online system 140, a user rating for the picker, which sources the picker has collected items at, or the picker's previous shopping history. Additionally, the picker data may include preferences expressed by the picker, such as their preferred sources to collect items at, how far they are willing to travel to deliver items to a user, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online system 140.

Additionally, the data collection module 200 collects order data, which is information or data that describes characteristics of an order. For example, order data may include item data for items that are included in the order, a delivery location for the order, a user associated with the order, a source location from which the user wants the ordered items collected, or a timeframe within which the user wants the order delivered. Order data may further include information describing how the order was serviced, such as which picker serviced the order, when the order was delivered, or a rating that the user gave the delivery of the order. In some embodiments, the order data includes user data for users associated with the order, such as user data for a user who placed the order or picker data for a picker who serviced the order.

While user data, picker data, source data, item data, and order data are described separately, data collected by the data collection module 200 may fall into more than one of these categories. For example, data describing a picker's performance for an order may be order data and picker data.

The presentation module 210 selects content for presentation to a user. For example, the presentation module 210 selects which items to present to a user while the user is placing an order. The presentation module 210 generates and transmits an ordering interface for the user to order items. The presentation module 210 populates the ordering interface with items that the user may select for adding to their order. In some embodiments, the presentation module 210 presents a catalog of all items that are available to the user, which the user can browse to select items to order. The presentation module 210 also may identify items that the user is most likely to order and present those items to the user. For example, the presentation module 210 may score items and rank the items based on their scores. The presentation module 210 displays the items with scores that exceed some threshold (e.g., the top n items or the p percentile of items).

The presentation module 210 may use an item selection model to score items for presentation to a user. An item selection model is a machine-learning model that is trained to score items for a user based on item data for the items and user data for the user. For example, the item selection model may be trained to determine a likelihood that the user will order the item. In some embodiments, the item selection model uses item embeddings describing items and user embeddings describing users to score items. These item embeddings and user embeddings may be generated by separate machine-learning models and may be stored in the data store 240.

In some embodiments, the presentation module 210 scores items based on a search query received from the user client device 100. A search query is free text for a word or set of words that indicate items of interest to the user. The presentation module 210 scores items based on a relatedness of the items to the search query. For example, the presentation module 210 may apply natural language processing (NLP) techniques to the text in the search query to generate a search query representation (e.g., an embedding) that represents characteristics of the search query. The presentation module 210 may use the search query representation to score candidate items for presentation to a user (e.g., by comparing a search query embedding to an item embedding).

In some embodiments, the presentation module 210 scores items based on a predicted availability of an item. The presentation module 210 may use an availability model to predict the availability of an item. An availability model is a machine-learning model that is trained to predict the availability of an item at a particular source location. For example, the availability model may be trained to predict a likelihood that an item is available at a source location or may predict an estimated number of items that are available at a source location. The presentation module 210 may apply a weight to the score for an item based on the predicted availability of the item. Alternatively, the presentation module 210 may filter out items from presentation to a user based on whether the predicted availability of the item exceeds a threshold.

In some embodiments, the presentation module 210 may use one or more generative models to determine complementary items to present based on a search query received from the user client device 100. A generative model is a computational model that is trained to learn statistical relationships (e.g., underlying patterns or distributions) of data in order to generate new data. A generative model may be a language model, such as Large Language Model (LLM), that probabilistically models natural language using textual datasets (e.g., words scraped from the Internet), neural networks, and/or transformers. A generative model may be tuned on training datasets of tokenized text, where each unique combination of letters or symbols in text is treated as a word or symbol-grouping. The generative models may be tuned by the machine-learning training module 230, which is further described below.

The presentation module 210 inputs the search query to a recommendation module 250. The recommendation module 250 may determine one or more items described in the search query using text extraction, a generative language model, or the like. The recommendation module 250 sends the one or more items to the presentation module 210 for presentation.

The recommendation module 250 selects a set of complementary items based on one or more items that are described by (e.g., responsive to) the search query. Complementary items are items that may be used, consumed with, or otherwise experienced in conjunction with a queried item in a way that enhances or augments the use of the queried item. Complementary items may be found in recipes containing the queried item, may be historically bought often (e.g., over a threshold percentage of purchases) by customers at the same time as the queried item, or may have shared characteristics with the queried item. For example, complementary items for the queried item "salsa" are "tortilla chips" or "guacamole." In another example, complementary items for the queried item "birthday cake mix" are "birthday candles," "frosting," and "sprinkles."

In some embodiments, the recommendation module 250 selects a group title for groupings of the complementary items and outputs group titles with the selected set of complementary items. For instance, the recommendation module 250 may create groupings of the complementary items based on the complementary items in the grouping sharing characteristics with one another, being included in the same recipe, and/or often being bought together and may generate a group title for a grouping. For example, the recommendation module 250 may create a grouping of the complementary items of "salsa," "guacamole," and "hummus," which are all different types of dips, and generate the group title "Dips for Chips."

In some embodiments, the recommendation module 250 uses a recommendation model to select the complementary items and generate group titles. The recommendation model may be a generative language model tuned on a set of training data including items labeled with complementary items. In some embodiments, the recommendation model selects complementary items based on a similarity between the one or more items and the complementary items, as is described in related application Ser. No. 17/406,027, titled "Personalized Recommendation of Complementary to a User for Inclusion in an Order for Fulfillment by an Online Concierge System Based on Embeddings for a User and For Items," which was filed on Aug. 18, 2021. The recommendation module 250 sends the selected complementary items and associated group titles to the presentation module 210.

The presentation module 210 inputs the selected complementary items to a requirements model 260. The requirements model 260 may be a generative language model, such as an LLM or other machine-learning model, tuned to score input complementary items based on presentation requirements. Presentation requirements are requests for presentation of the complementary items. Each complementary item may be associated with a number of presentation instances and presentation requirements. The number of presentation instances indicates how many times a respective complementary item has been displayed on or interacted with via a client device 100 and may represent a level of interest by users in the respective complementary item. The presentation requirements may be input by an external entity and indicate a numerical representation for a complementary item and a prospective number of presentation instances requested by the external entity. The numerical representation of the requested content and prospective number of presentation instances may be directly related to the number of presentation instances of a respective complementary item. For example, the numerical representation and prospective number of presentation instances may each decrease as the number of presentation instances associated with the respective complementary item increases (e.g., the item is displayed or interacted with via a display).

The requirements model 260 is tuned based on a set of complementary items stored in the data store 240 along with associated numerical representations, prospective number of presentation instances, and numbers of presentation instances and a set of requirement parameters. The requirement parameters may specify a threshold for the numerical representation, a presentation instance threshold, a numerical representation reduction rate threshold, a presentation instance occurrence rate threshold, and the like. The requirements model 260 may be tuned to score complementary items that meet the requirement parameters higher than complementary items that do not. The requirements model 260 may be further tuned to rank complementary items based on numerical representation and prospective numbers of presentation instances. For example, for complementary items that meet all of the requirement parameters, the requirements model 260 may be tuned to rank complementary items from highest to lowest numerical representation or prospective number of presentation instances. The complementary items may be stored in a Snowflake table in the data store 240. The Snowflake table may have a table structure in a Snowflake Schema, which is a type of database structure in which data is stored in a streamlined, logical, and efficient manner to optimize data querying and analysis. The Snowflake Schema normalizes data to reduce data redundancy and improve data integrity.

Based on the tuning, the requirements model 260 scores the selected complementary items based on associated numerical representations, prospective number of presentation instances, number of presentation instances, and requirement parameters. The requirements model 260 outputs a first set of scores related to the complementary items to the presentation model 210.

In some embodiments, the requirements model 260 may also generate group titles for groupings of the selected complementary items and outputs the group titles with the first set of scores. The requirements model 260 may create groupings of the selected complementary items based on score, such as by selecting a threshold number of the highest scoring complementary items for a grouping. The requirements model 260 generates a group title for each grouping describing shared characteristics of the complementary items stored in the data store 240. For example, the requirements model 260 may create a grouping of complementary items that are stored in a pantry and generate the group title of "Pantry Pairings."

The presentation module 210 also inputs the selected complementary items to a search model 270. The search model 270 may be a generative language model, such as an LLM or other machine-learning model, tuned to score complementary items based on historical numbers of presentation instances of categories of the complementary items and search parameters, such as a historical numerical instance threshold. Categories are groupings of items that have shared characteristics. Each category may include a plurality of items and a plurality of subcategories (also referred to as "categories" for simplicity), where subcategories include a subset of the plurality of items that have additional shared characteristics with one another. For example, the item "Butterfly Organic Butter" may be in the categories "Dairy" and "Butter," where "Butter" is a category of "Dairy." Categories are stored in the data store 240. In some embodiments, the data collection module 200 or another portion of the online system 140 organizes the categories into a taxonomy that is stored in the data store 240. This process and the taxonomy are described in related application Ser. No. 17/196,855, titled "Inferring Categories in a Product Taxonomy Using a Replacement Model," which was filed on Mar. 9, 2021.

The search model 270 is tuned to score complementary items based on historical numbers of presentation instances associated with categories stored in the data store 240. Each historical presentation instance may represent how often a customer selected and/or obtained an item of the category following the customer's submission of a search query. The number of historical numbers of presentation instances associated with a category may be based on an aggregate of the items in the category or may be an average of historical numbers of presentation instances of the individual items. In some embodiments, the categories and associated historical numbers of presentation instances are stored in a Snowflake table in the data store 240, which the search model 270 uses to select categories. The search model 270 scores the complementary items based on associated categories and the search parameters. For example, the search model 270 may be tuned to score complementary items that meet the search parameters higher than complementary items that do not, score each complementary item based on an associated category with the highest number of historical numbers of presentation instances of the categories associated with the complementary item, etc. The search model 270 sends a second set of scores associated with the complementary items to the presentation module 210.

In some embodiments, the search model 270 may generate group titles for categories. The search model 270 selects a top percentage of the complementary items based on score and determines groupings of complementary items associated with one or more common categories. The search model 270 determined group titles associated with the groupings based on the category and characteristics of the complementary items in the category. The search model 270 outputs the group titles with the set of requested content. For example, the search model 270 may generate the group title "Ice Cream Toppings" for the items "chocolate syrup," "sprinkles," and "whipped cream," which are each associated with the category "Ice Cream." The search model may output the group titles and associated groupings of complementary items with the second set of scores.

The presentation module 210 receives the first set of scores from the requirements model 260 and the second set of scores from the search model 270. The presentation module 210 inputs the first and second set of scores and the selected complementary items to a selection module 280. The selection module 280 aggregates the first and second set of scores for the selected complementary items and ranks the complementary items based on the aggregate scores. The selection module 280 outputs the ranking to the presentation module 210.

In some embodiments, the selection module 280 may retrieve a desired item number and priority ratio from the data store 240 or input via an interface presented to an operator associated with the online system 140. The desired item number indicates how many items for the selection module 280 to include in the ranking of the selected complementary items. The priority ratio represents a desired balance between presenting complementary items associated with the first set of scores versus complementary items associated with the second set of scores. The selection module 280 selects a first subset of the first set of scores and a second subset of the second set of scores such that the number of complementary items in the first subset and second subset combined comprise the desired item number and a ratio of the first subset to the second subset comprise the priority ratio. The selection module 280 combines the first subset and second subset into a ranked list of scores and outputs the ranked list of scores.

In some embodiments, each score in the first and second set of scores includes a first subscore and a second subscore. For example, each first subscore may represent a numerical representation of a respective complementary item, and each second subscore may represent historical numbers of presentation instances associated with a respective complementary item. In another example, each first subscore may represent whether an associated numerical representation that exceeds a first threshold, and each second subscore may represent whether an associated number of historical numbers of presentation instances exceeds a second threshold.

The selection module 280 creates a first ranking of the complementary items based on the first subscores and a second ranking of the complementary items based on the second subscores. The selection module 290 selects the first subset of the first set of scores from the first ranking and the second subset from the second set of scores from the second ranking. The selection module determines a combined score for each complementary item in the first and second subset using the first and second subscores and ranks the complementary items based on the combined scores. The selection module 280 outputs the ranking to the presentation module 210. For example, for a desired item number of five and a priority ratio of 60-to-40, the selection module 280 selects the complementary items associated with the three highest first subscores scores for the first subset and the complementary items associated with the two highest second subscores for the second subset. The selection module 280 ranks the complementary items in the first and second subset together based on each complementary item's combined first subscore and second subscore, weighted by the priority ratio. The selection module sends the ranked complementary items to the presentation module 210.

In some embodiments, the selection module 280 is a generative language model, such as an LLM or other machine-learning model, tuned to rank the selected complementary items. In these embodiments, the presentation module 210 may create an input prompt for the selection module 280. The input prompt includes the one or more items that are responsive to the search query, the selected complementary items, first set of scores, the second set of scores, the desired item number, and/or the priority ratio. In some embodiments, the input prompt includes a set of metrics from the data store 240 or input via an interface presented to an operator associated with the online system 140. The metrics may include a numerical representation utilization rate amongst other items, presentation instance rates amongst other items, average presentation instance rate, and the like.

The presentation module 210 inputs the prompt to the selection module 280, which is tuned to output a ranking of the selected complementary items based on the prompt. In some embodiments, the selection module 280 determines a utility function that represents a preference for complementary items. The selection module 280 determines a utility function for the complementary items based on the metrics and the input prompt. The selection module 280 maximizes the utility function for the complementary items and ranks the complementary items based on the associated outputs of the utility function.

In some embodiments, the selection module outputs an aggregate score for each of the selected complementary items and the presentation module 210 ranks the complementary items based on the aggregate scores. For instance, the selection module 280 may define a utility function and determine an aggregate score for each complementary item based on a maximum for the utility function. The selection module sends the aggregate scores to the presentation module 210, which ranks the complementary items based on the aggregate scores.

The presentation module 210 sends the one or more items that are responsive to the search query and the ranked complementary items for presentation via an interface at the user device 100 that provided the search query. In some embodiments, the presentation module 210 communicates with the interface system 160 to cause the one or more items and ranked complementary items to be displayed at the user device 100. The presentation module 210 may cause the interface to display the one or more items in a first carousel and the ranked complementary items in ranked order in a second carousel. The second carousel may be labeled with a group title associated with one or more or a threshold number of the ranked complementary items. A user can interact with the carousels (or, in some embodiments, another interactive element) at the user device 100 to browse through and select the one or more items and ranked complementary items. In response to a selection, the presentation module 210 causes the interface to display information associated with the respective item, such that the user can interact with interactive elements to add the item to an order, view more information about the item, etc.

The order management module 220 manages orders for items from users. The order management module 220 receives orders from a user client device 100 and offers the orders to pickers for service based on picker data. For example, the order management module 220 offers an order to a picker based on the picker's location and the location of the source from which the ordered items are to be collected. The order management module 220 may also offer an order to a picker based on how many items are in the order, a vehicle operated by the picker, the delivery location, the picker's preferences on how far to travel to deliver an order, the picker's ratings by users, or how often a picker agrees to service an order.

In some embodiments, the order management module 220 determines when to offer an order to a picker based on a delivery timeframe requested by the user with the order. The order management module 220 computes an estimated amount of time that it would take for a picker to collect the items for an order and deliver the ordered items to the delivery location for the order. The order management module 220 offers the order to a picker at a time such that, if the picker immediately accepts and services the order, the picker is likely to deliver the order at a time within the requested timeframe. Thus, when the order management module 220 receives an order, the order management module 220 may delay offering the order to a picker if the requested timeframe is far enough in the future (i.e., the picker may be offered the order at a later time and is still predicted to meet the requested timeframe).

When the order management module 220 offers an order to a picker, the order management module 220 transmits the order to the picker client device 110 associated with the picker. The order management module 220 may also transmit navigation instructions from the picker's current location to the source location associated with the order. If the order includes items to collect from multiple source locations, the order management module 220 identifies the source locations to the picker and may also specify a sequence in which the picker should visit the source locations.

The order management module 220 may track the location of the picker through the picker client device 110 to determine when the picker arrives at the source location. When the picker arrives at the source location, the order management module 220 transmits the order to the picker client device 110 for display to the picker. As the picker uses the picker client device 110 to collect items at the source location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the user client device 100 that describe which items have been collected for the user's order.

In some embodiments, the order management module 220 tracks the location of the picker within the source location. The order management module 220 uses sensor data from the picker client device 110 or from sensors in the source location to determine the location of the picker in the source location. The order management module 220 may transmit, to the picker client device 110, instructions to display a map of the source location indicating where in the source location the picker is located. Additionally, the order management module 220 may instruct the picker client device 110 to display the locations of items for the picker to collect, and may further display navigation instructions for how the picker can travel from their current location to the location of the next item to collect for an order.

The order management module 220 determines when the picker has collected the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the source location to the delivery location, or to a subsequent source location for further item collection. The order management module 220 tracks the location of the picker as the picker travels to the delivery location for an order, and updates the user with the location of the picker so that the user can track the progress of the order. In some embodiments, the order management module 220 computes an estimated time of arrival of the picker at the delivery location and provides the estimated time of arrival to the user.

In some embodiments, the order management module 220 facilitates communication between the user client device 100 and the picker client device 110. As noted above, a user may use a user client device 100 to send a message to the picker client device 110. The order management module 220 receives the message from the user client device 100 and transmits the message to the picker client device 110 for presentation to the picker. The picker may use the picker client device 110 to send a message to the user client device 100 in a similar manner.

The order management module 220 coordinates payment by the user for the order. The order management module 220 uses payment information provided by the user (e.g., a credit card number or a bank account) to receive payment for the order. In some embodiments, the order management module 220 stores the payment information for use in subsequent orders by the user. The order management module 220 computes the total cost for the order and charges the user that cost. The order management module 220 may provide a portion of the total cost to the picker for servicing the order, and another portion of the total cost to the source.

The machine-learning training module 230 trains machine-learning models used by the online system 140. For example, the machine-learning module 230 may train the item selection model, the availability model, requirements model 260, search model 270, or any of the machine-learned models deployed by online system 140. The online system 140 may use machine-learning models to perform functionalities described herein. Example machine-learning models include regression models, support vector machines, naïve Bayes, decision trees, k nearest neighbors, random forest, boosting algorithms, k-means, and hierarchical clustering. The machine-learning models may also include neural networks, such as perceptrons, multilayer perceptrons, convolutional neural networks, recurrent neural networks, sequence-to-sequence models, generative adversarial networks, transformers, large-language models, or multi-modal large language models. A machine-learning model may include components relating to these different general categories of model, which may be sequenced, layered, or otherwise combined in various configurations. While the term “machine-learning model” may be broadly used herein to refer to any kind of machine-learning model, the term is generally limited to those types of models that are suitable for performing the described functionality. For example, certain types of machine-learning models can perform a particular functionality based on the intended inputs to, and outputs from, the model, the capabilities of the system on which the machine-learning model will operate, or the type and availability of training data for the model.

Each machine-learning model includes a set of parameters. The set of parameters for a machine-learning model are parameters that the machine-learning model uses to process an input to generate an output. For example, a set of parameters for a linear regression model may include weights that are applied to each input variable in the linear combination that comprises the linear regression model. Similarly, the set of parameters for a neural network may include weights and biases that are applied at each neuron in the neural network. The machine-learning training module 230 generates the set of parameters (e.g., the particular values of the parameters) for a machine-learning model by “training” the machine-learning model. Once trained, the machine-learning model uses the set of parameters to transform inputs into outputs.

The machine-learning training module 230 trains a machine-learning model based on a set of training examples. Each training example includes input data to which the machine-learning model is applied to generate an output. For example, each training example may include user data, picker data, item data, or order data. In some cases, the training examples also include a label which represents an expected output of the machine-learning model. In these cases, the machine-learning model is trained by comparing its output from the input data of a training example to the label for the training example. In general, during training with labeled data, the set of parameters of the model may be set or adjusted to reduce a difference between the output for the training example (given the current parameters of the model) and the label for the training example.

The machine-learning training module 230 may apply an iterative process to train a machine-learning model whereby the machine-learning training module 230 updates parameter values of the machine-learning model based on each of the set of training examples. The training examples may be processed together, individually, or in batches. To train a machine-learning model based on a training example, the machine-learning training module 230 applies the machine-learning model to the input data in the training example to generate an output based on a current set of parameter values. The machine-learning training module 230 scores the output from the machine-learning model using a loss function. A loss function is a function that generates a score for the output of the machine-learning model such that the score is higher when the machine-learning model performs poorly and lower when the machine-learning model performs well. In cases where the training example includes a label, the loss function is also based on the label for the training example. Some example loss functions include the mean square error function, the mean absolute error, hinge loss function, and the cross entropy loss function. The machine-learning training module 230 updates the set of parameters for the machine-learning model based on the score generated by the loss function. For example, the machine-learning training module 230 may apply gradient descent to update the set of parameters.

In some embodiments, the machine-learning training module 230 may retrain the machine-learning model based on the actual performance of the model after the online system 140 has deployed the model to provide service to users. For example, if the machine-learning model is used to predict a likelihood of an outcome of an event, the online system 140 may log the prediction and an observation of the actual outcome of the event. Alternatively, if the machine-learning model is used to classify an object, the online system 140 may log the classification as well as a label indicating a correct classification of the object (e.g., following a human labeler or other inferred indication of the correct classification). After sufficient additional training data has been acquired, the machine-learning training module 230 re-trains the machine-learning model using the additional training data, using any of the methods described above. This deployment and re-training process may be repeated over the lifetime use for the machine-learning model. This way, the machine-learning model continues to improve its output and adapts to changes in the system environment, thereby improving the functionality of the online system 140 as a whole in its performance of the tasks described herein.

The data store 240 stores data used by the online system 140. For example, the data store 240 stores user data, item data, order data, and picker data for use by the online system 140. The data store 240 also stores trained machine-learning models trained by the machine-learning training module 230. For example, the data store 240 may store the set of parameters for a trained machine-learning model on one or more non-transitory, computer-readable media. The data store 240 uses computer-readable media to store data, and may use databases to organize the stored data.

With respect to the machine-learned models hosted by the model serving system 150, the machine-learned models may already be trained by a separate entity from the entity responsible for the online system 140. In one or more other embodiments, when the model serving system 150 is included in the online system 140, the machine-learning training module 230 may further train parameters of the machine-learned model based on data specific to the online system 140 stored in the data store 240. As an example, the machine-learning training module 230 may obtain a pre-trained transformer language model and further fine tune the parameters of the transformer model using training data stored in the data store 240. The machine-learning training module 230 may provide the model to the model serving system 150 for deployment.

Figure 3:
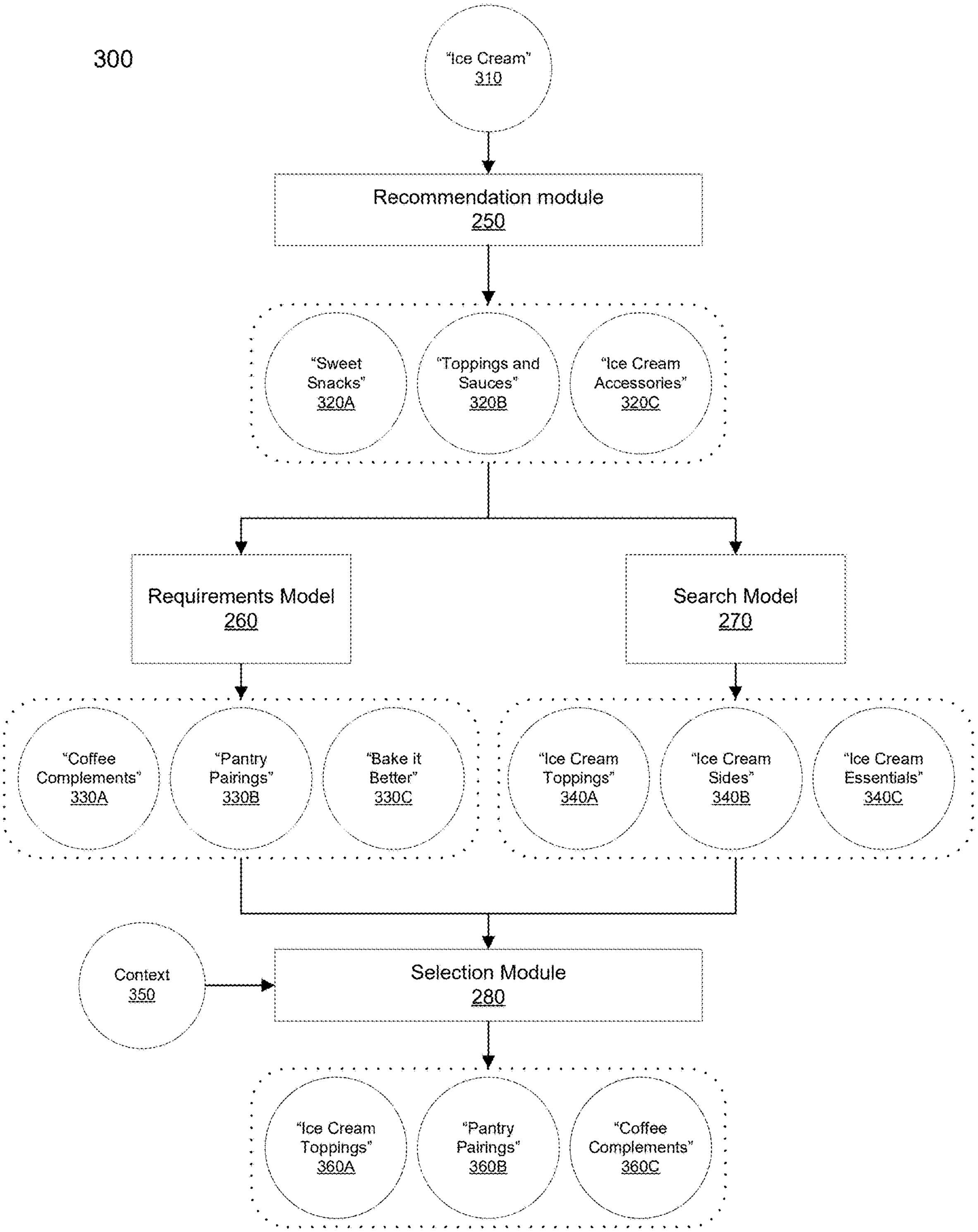
FIG. 3 illustrates a block diagram of an example process for selecting group titles for an ordering interface, in accordance with one or more embodiments.

FIG. 3 illustrates a block diagram of an example process 300 for selecting a set of group titles for an ordering interface, in accordance with one or more embodiments. Though FIG. 3 is described in relation to the presentation module 210, any other module of the online system 140 may perform the process 300. Further, in some embodiments, the process may include additional or alternative steps to those shown in FIG. 3.

The presentation module 210 receives the search query "Ice Cream" 310 from a user client device 100. The presentation module 210 inputs the search query 310 to the recommendation module 250, which selects a set of complementary products for the search query. The recommendation module 250 may create groupings of the complementary products and produce a group title 320 for each grouping that describes complementary products in the set. For example, the group title "Toppings and Sauces" 320B may include complementary items "Rainbow Sprinkles," "Brand X chocolate sauce," and "Brand Y whipped cream," which are complementary items for the item "ice cream."

The presentation module 210 inputs the selected complementary items, along with associated group titles 320, to the requirements model 260 and the search model 270. The requirements model 260 is a generative model tuned to score complementary products based on prospective numbers of presentation instances and associated numerical representations. For example, the requirements model 260 generate and output group titles for groupings of the complementary items determined based on the first set of scores. In some embodiments, the requirements model 260 uses a group title determined by the recommendation module 250 based on the grouping of complementary items given the same group title by the recommendation module 250. The requirements model 260 sends the first set of scores and associated group titles 330 generated for groupings to the selection module 280.

The search model 270 may be a generative language model tuned to create a second set of scores for the complementary items. For example, the search model 270 may score complementary items based on number of presentation instances, average user ratings, or another indication that individuals are likely to interact with the item if presented. The search model 270 may also create groupings of the complementary items based on the second set of scores and generate group titles for the groupings. The search model 270 sends the second set of scores and group titles 340 to the selection module 280.

The selection module 280 ranks the complementary items based on the first and second sets of scores. In particular, the selection module 280 is tuned to optimize for likelihood that selected complementary items will experience a reduction in associated numerical representation or a presentation instance when shown in response to the search query. The selection module 280 may do so using additional context 350 (e.g., metrics associated with the items, categories of the items, store goals, etc.). In some embodiments, the selection module 280 is a generative model that is tuned to output a ranking of complementary items based on a prompt including the one or more items that are responsive to the search query 310, the selected complementary items, the first set of scores, and the second set of scores.

The selection module 280 may determine a ranking of the selected complementary items that optimizes for a reduction in numerical representation and likelihood of presentation instance occurrence of the complementary items if presented. In some embodiments, the selection module 280 may create a grouping of a threshold number of top ranked complementary items and determine one or more group titles associated with the complementary items in the grouping. For instance, the selection module may select a group title associated with each item in the grouping or with a threshold number of the complementary items in the grouping. The selection module 280 may output the group titles with the ranking. For example, the selection module 280 may output the group titles of "Ice Cream Toppings" 360A, "Pantry Pairing" 360B, and "Coffee Complements" 360C, which each include complementary that are within a top percentage (e.g., top ten items, top 20% of, etc.) of the ranking. The selection module may also indicate which complementary items in the ranking are associated with each output group title. The presentation module 210 may select a group title associated with a highest ranked complementary item or may select a group title associated with the most complementary items (as compared to the other group titles). The presentation module 210 sends the selected group title for presentation with its associated complementary items ordered based on the ranking.

Figure 4:
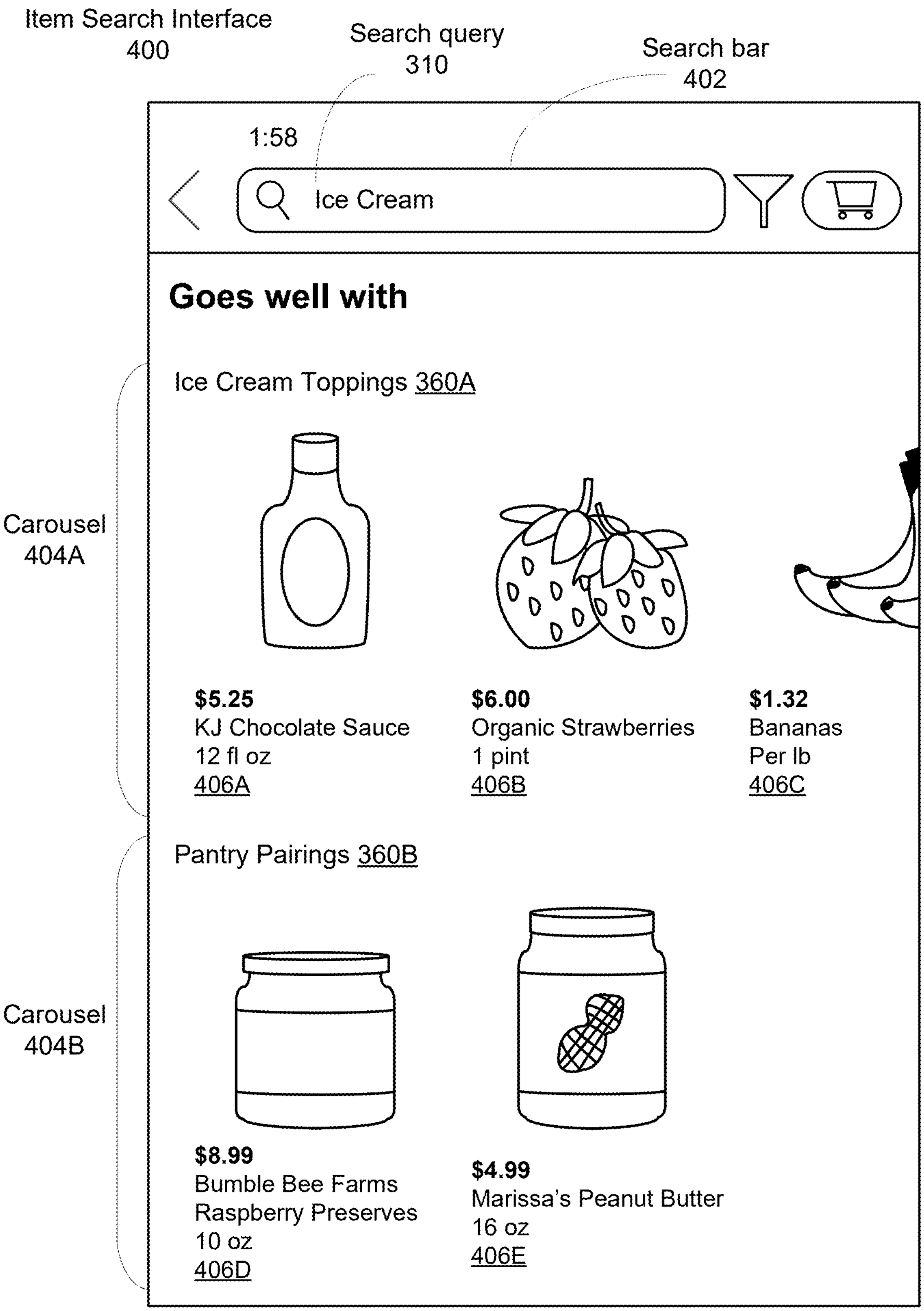
FIG. 4 illustrates an example ordering interface displaying a selected set of categories, in accordance with one or more embodiments.

FIG. 4 illustrates an example item search interface 400 displaying a selected set of complementary items 406, in accordance with one or more embodiments. The item search interface 400 includes a search bar 402 that receives the search query 310 "Ice Cream." In some embodiments, the item search interface 400 includes a one or more items that directly respond to the search query 310 (e.g., various ice creams) at a top of the item search interface 400 in a carousel, which a user can interact with to view the one or more items. The item search interface 400 includes two carousels 404A and 404B configured to receive user interactions with the complementary items 406 shown in the carousels 404 (e.g., so that a user can scroll through complementary items 406 presented in the carousel 404). Each carousel 404 is associated with a group title 360 output by the selection module 280 and complementary items 406 that the selection module 280 determined were each likely to be associated with an increase in presentation instances and reduction in numerical representations if displayed. For example, "Ice Cream Toppings" 360A includes the complementary item "KJ Chocolate Sauce" 406A, which has a numerical representation that may be reduced upon a user interacting with the complementary item 406A via the item search interface 400.

Figure 5:
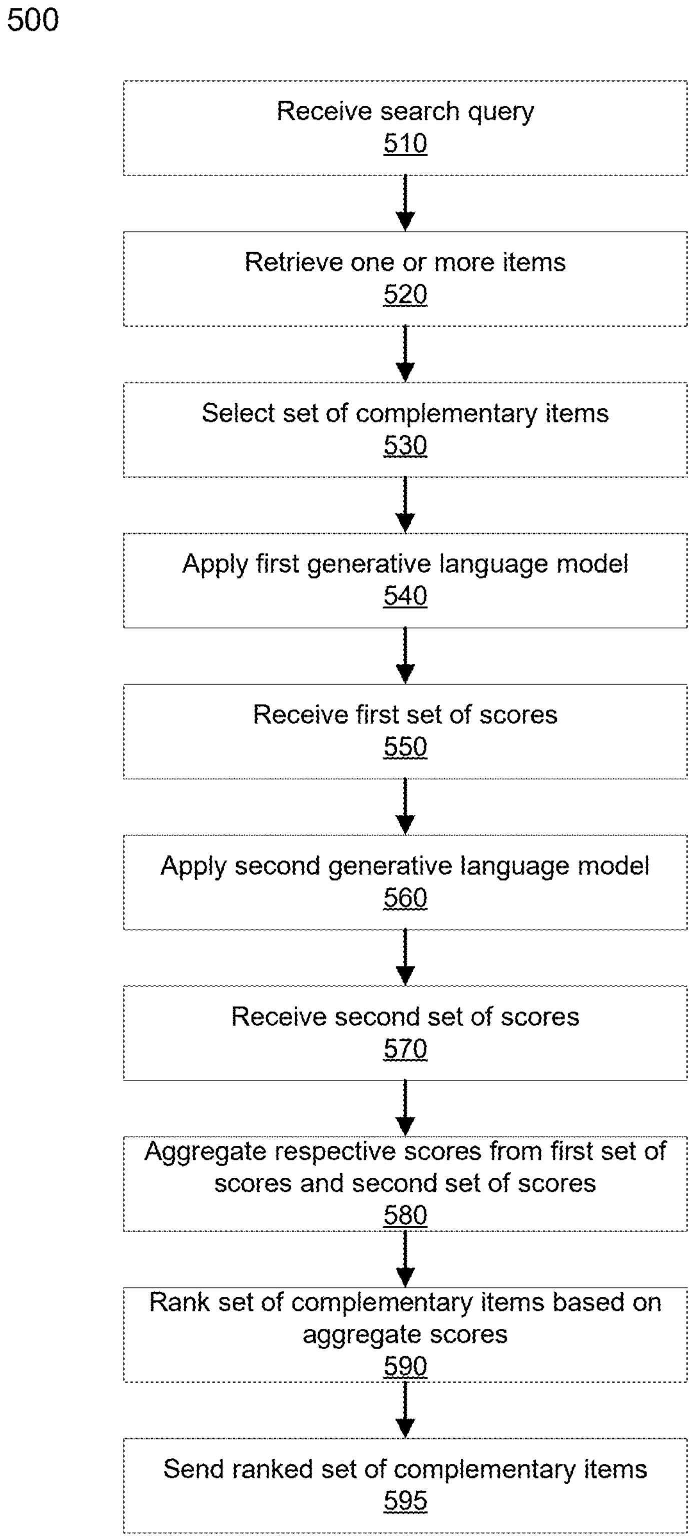
FIG. 5 is a flowchart for a method of ranking a set of complementary items using generative language models, in accordance with one or more embodiments.

FIG. 5 is a flowchart for a method of ranking a set of complementary items using generative language models, in accordance with one or more embodiments. Alternative embodiments may include more, fewer, or different steps from those illustrated in FIG. 5, and the steps may be performed in a different order from that illustrated in FIG. 5. These steps may be performed by an online system (e.g., online system 140). Additionally, each of these steps may be performed automatically by the online system without human intervention.

The online system 140 receives 510 a search query entered at an item search interface presented at a user client device 100. The online system 140 retrieves 520 one or more items that are responsive to the search query and selects 530 complementary items (or products) to the one or more items. In some embodiments, the online system 140 applies a generative language model to the search query to select the complementary items. The generative language model may be tuned to select complementary items based on a measure of similarity between the one or more items identified from the search query and the complementary items.

The online system 140 applies 540 a first machine learning model to the selected complementary items. The first machine learning model may be a generative language model and may be tuned on presentation requirements for each of the set of complementary items. The presentation requirements associated with each complementary item may include a prospective number of presentation instances for the respective complementary item and a desired reduction in a numerical representation associated with the respective complementary item. The online system 140 receives 550 a first set of scores from the first machine learning model.

The online system 140 applies 560 a second machine learning model to the selected complementary products. The second machine learning model may be a generative language model and is tuned with historical numbers of presentation instances of items stored at the data store 240. The online system 140 receives 570 a second set of scores from the second machine learning model. The online system 140 aggregates 580, for each of the set of complementary items, respective scores from the first set of scores and the second set of scores and ranks 590 the set of complementary items based on the aggregate scores. The online system sends 595 the ranked set of complementary items to the item search interface for display at the user client device 100.

ADDITIONAL CONSIDERATIONS

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated with the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a non-limiting example, the condition "A, B, or C" is satisfied when A and B are true (or present) and C is false (or not present). Similarly, as another non-limiting example, the condition "A, B, or C" is satisfied when A is true (or present) and B and C are false (or not present).

What is claimed is:

1. A method, performed at a computer system comprising a processor and a computer-readable medium, comprising:

receiving, from a client device, a search query entered at an item search interface presented at the client device;

retrieving one or more items that are responsive to the search query;

selecting a set of complementary items to the one or more items that are responsive to the search query;

applying a first generative language model to each of the set of complementary items, wherein the first generative language model is tuned on presentation requirements for each of the set of complementary items, wherein the presentation requirements associated with each complementary item include a prospective number of presentation instances for the respective complementary item at one or more client devices;

receiving, from the first generative language model, a first set of scores for the complementary items;

applying a second generative language model to the set of complementary items, wherein the second generative language model is tuned with historical presentation instances of each of the set of complementary items;

receiving, from the second generative language model, a second set of scores for the complementary items;

aggregating, for each of the set of complementary items, respective scores from the first set of scores and the second set of scores;

ranking the set of complementary items based on the aggregate scores; and sending, to the client device, the ranked set of complementary items and the one or more items for display at the item search interface presented at the client device.

2. The method of claim 1, wherein selecting complementary items to the one or more items that are responsive to the search query comprises:

applying a third generative language model to the one or more items that are responsive to the search query, wherein the third generative language model is tuned on measures of similarity between items.

3. The method of claim 1, wherein aggregating, for each of the set of complementary items, respective scores from the first set of scores and the second set of scores comprises:

receiving a desired item number and priority ratio;

selecting a first subset of the first set of scores and a second subset of the second set of scores, wherein the first subset and second subset combined comprise the desired item number and a ratio of the first subset to the second subset comprise the priority ratio; and combining the first subset and second subset into a ranked list of scores.

4. The method of claim 3, wherein each of the first set of scores and the second set of scores includes a first subscore and a second subscore, the method further comprising:

ranking the complementary items into a first ranking by first subscore and a second ranking by second subscore, wherein the first subscore represents a numerical representation of a respective complementary item and the second subscore represents presentation instances associated with the respective complementary item;

selecting the first subset of the first set of scores from the first ranking and the second subset of the second set of scores from the second ranking;

determining a combined score for each complementary item in the first subset and second subset, wherein the combined score is based on the first subscore and the second subscore; and ranking the first subset and second subset into a third ranking based on the combined scores.

5. The method of claim 1, wherein aggregating, for each of the set of complementary items, respective scores from the first set of scores and the second set of scores comprises:

creating an input prompt for a third generative language model, wherein the input prompt includes the first set of scores and second set of scores, each score associated with a respective complementary item; and inputting the prompt to the third generative language model, the third generative language model tuned to output an aggregate score for each complementary item of the prompt.

6. The method of claim 5, wherein each score is associated with a numerical representation that indicates a prospective number of presentation instances for a respective complementary item or a number of presentation instances representing a level of interest in the respective complementary item.

7. The method of claim 1, wherein sending the ranked set of complementary items and the one or more items for display comprises:

causing the item search interface to display the one or more items in a first carousel and the ranked set of complementary items in a second carousel.

8. A non-transitory computer-readable storage medium storing instructions that, when executed, cause a processor to perform steps comprising:

receiving, from a client device, a search query entered at an item search interface presented at the client device;

retrieving one or more items that are responsive to the search query;

selecting a set of complementary items to the one or more items that are responsive to the search query;

applying a first generative language model to each of the set of complementary items, wherein the first generative language model is tuned on presentation requirements for each of the set of complementary items, wherein the presentation requirements associated with each complementary item include a prospective number of presentation instances for the respective complementary item at one or more client devices;

receiving, from the first generative language model, a first set of scores for the complementary items;

applying a second generative language model to the set of complementary items, wherein the second generative language model is tuned with historical presentation instances of each of the set of complementary items;

receiving, from the second generative language model, a second set of scores for the complementary items;

aggregating, for each of the set of complementary items, respective scores from the first set of scores and the second set of scores;

ranking the set of complementary items based on the aggregate scores; and sending, to the client device, the ranked set of complementary items and the one or more items for display at the item search interface presented at the client device.

9. The non-transitory computer-readable storage medium of claim 8, wherein selecting complementary items to the one or more items that are responsive to the search query comprises:

applying a third generative language model to the one or more items that are responsive to the search query, wherein the third generative language model is tuned on measures of similarity between items.

10. The non-transitory computer-readable storage medium of claim 8, wherein aggregating, for each of the set of complementary items, respective scores from the first set of scores and the second set of scores comprises:

receiving a desired item number and priority ratio;

selecting a first subset of the first set of scores and a second subset of the second set of scores, wherein the first subset and second subset combined comprise the desired item number and a ratio of the first subset to the second subset comprise the priority ratio; and combining the first subset and second subset into a ranked list of scores.

11. The non-transitory computer-readable storage medium of claim 10, wherein each of the first set of scores and the second set of scores includes a first subscore and a second subscore, the steps further comprising:

ranking the complementary items into a first ranking by first subscore and a second ranking by second subscore, wherein the first subscore represents a numerical representation of a respective complementary item and the second subscore represents presentation instances associated with the respective complementary item;

selecting the first subset of the first set of scores from the first ranking and the second subset of the second set of scores from the second ranking;

determining a combined score for each complementary item in the first subset and second subset, wherein the combined score is based on the first subscore and the second subscore; and ranking the first subset and second subset into a third ranking based on the combined scores.

12. The non-transitory computer-readable storage medium of claim 8, wherein aggregating, for each of the set of complementary items, respective scores from the first set of scores and the second set of scores comprises:

creating an input prompt for a third generative language model, wherein the input prompt includes the first set of scores and second set of scores, each score associated with a respective complementary item; and inputting the prompt to the third generative language model, the third generative language model tuned to output an aggregate score for each complementary item of the prompt.

13. The non-transitory computer-readable storage medium of claim 12, wherein each score is associated with a numerical representation that indicates a prospective number of presentation instances for a respective complementary item or a number of presentation instances representing a level of interest in the respective complementary item.

14. The non-transitory computer-readable storage medium of claim 8, wherein sending the ranked set of complementary items and the one or more items for display comprises:

causing the item search interface to display the one or more items in a first carousel and the ranked set of complementary items in a second carousel.

15. A system comprising:

a processor; and a non-transitory computer-readable storage medium storing instructions that, when executed, cause the processor to perform steps comprising:

receiving, from a client device, a search query entered at an item search interface presented at the client device;

retrieving one or more items that are responsive to the search query;

selecting a set of complementary items to the one or more items that are responsive to the search query;

applying a first generative language model to each of the set of complementary items, wherein the first generative language model is tuned on presentation requirements for each of the set of complementary items, wherein the presentation requirements associated with each complementary item include a prospective number of presentation instances for the respective complementary item at one or more client devices;

receiving, from the first generative language model, a first set of scores for the complementary items;

applying a second generative language model to the set of complementary items, wherein the second generative language model is tuned with historical presentation instances of each of the set of complementary items;

receiving, from the second generative language model, a second set of scores for the complementary items;

aggregating, for each of the set of complementary items, respective scores from the first set of scores and the second set of scores;

ranking the set of complementary items based on the aggregate scores; and sending, to the client device, the ranked set of complementary items and the one or more items for display at the item search interface presented at the client device.

16. The system of claim 15, wherein selecting complementary items to the one or more items that are responsive to the search query comprises:

applying a third generative language model to the one or more items that are responsive to the search query, wherein the third generative language model is tuned on measures of similarity between items.

17. The system of claim 15, wherein aggregating, for each of the set of complementary items, respective scores from the first set of scores and the second set of scores comprises:

receiving a desired item number and priority ratio;

selecting a first subset of the first set of scores and a second subset of the second set of scores, wherein the first subset and second subset combined comprise the desired item number and a ratio of the first subset to the second subset comprise the priority ratio; and combining the first subset and second subset into a ranked list of scores.

18. The system of claim 17, wherein each of the first set of scores and the second set of scores includes a first subscore and a second subscore, the steps further comprising:

ranking the complementary items into a first ranking by first subscore and a second ranking by second subscore, wherein the first subscore represents a numerical representation of a respective complementary item and the second subscore represents presentation instances associated with the respective complementary item;

selecting the first subset of the first set of scores from the first ranking and the second subset of the second set of scores from the second ranking;

determining a combined score for each complementary item in the first subset and second subset, wherein the combined score is based on the first subscore and the second subscore; and ranking the first subset and second subset into a third ranking based on the combined scores.

19. The system of claim 15, wherein aggregating, for each of the set of complementary items, respective scores from the first set of scores and the second set of scores comprises:

creating an input prompt for a third generative language model, wherein the input prompt includes the first set of scores and second set of scores, each score associated with a respective complementary item; and inputting the prompt to the third generative language model, the third generative language model tuned to output an aggregate score for each complementary item of the prompt.

20. The system of claim 15, wherein sending the ranked set of complementary items and the one or more items for display comprises:

causing the item search interface to display the one or more items in a first carousel and the ranked set of complementary items in a second carousel.

* * * * *